Nov. 1, 1966    J. T. RICHARDSON ETAL    3,283,243
APPARATUS FOR INDICATING THE THERMAL E.M.F.
AND A.C. CONDUCTIVITY OF A CATALYST
Filed Oct. 22, 1962

INVENTORS.
JAMES T. RICHARDSON,
STANFORD S. TOUPS,
BY Frank S. Troidl
ATTORNEY.

3,283,243
APPARATUS FOR INDICATING THE THERMAL E.M.F. AND A.C. CONDUCTIVITY OF A CATALYST
James T. Richardson and Stanford S. Toups, Baytown, Tex., assignors, by mesne assignments, to Esso Research and Engineering Company, Elizabeth, N.J., a corporation of Delaware
Filed Oct. 22, 1962, Ser. No. 231,885
3 Claims. (Cl. 324—62)

This invention relates to apparatus for measuring and controlling the catalytic properties of a catalyst bed. More particularly, this invention is a probe designed to measure the electrical properties of the catalyst in the catalyst bed at a reaction temperature and pressure.

It has been found that the electrical properties of a catalyst are related to the catalytic properties of the catalyst in a manner which can be determined empirically. Hence, an apparatus such as the one described and claimed herein is very useful in measuring the electrical properties of the catalyst. The signals monitored by this new and improved apparatus can be used to actuate control devices to change the catalytic state of the catalyst.

The invention, as well as its many advantages, will be further understood by reference to the following detailed description and drawing in which.

Figure 1:
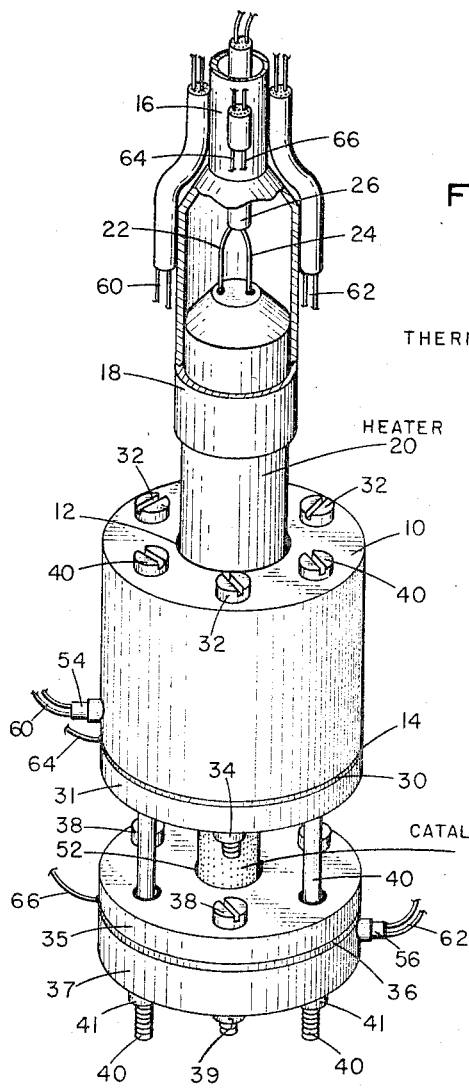
FIG. 1 is an isometric view showing a preferred embodiment of the present invention.
Figure 2:
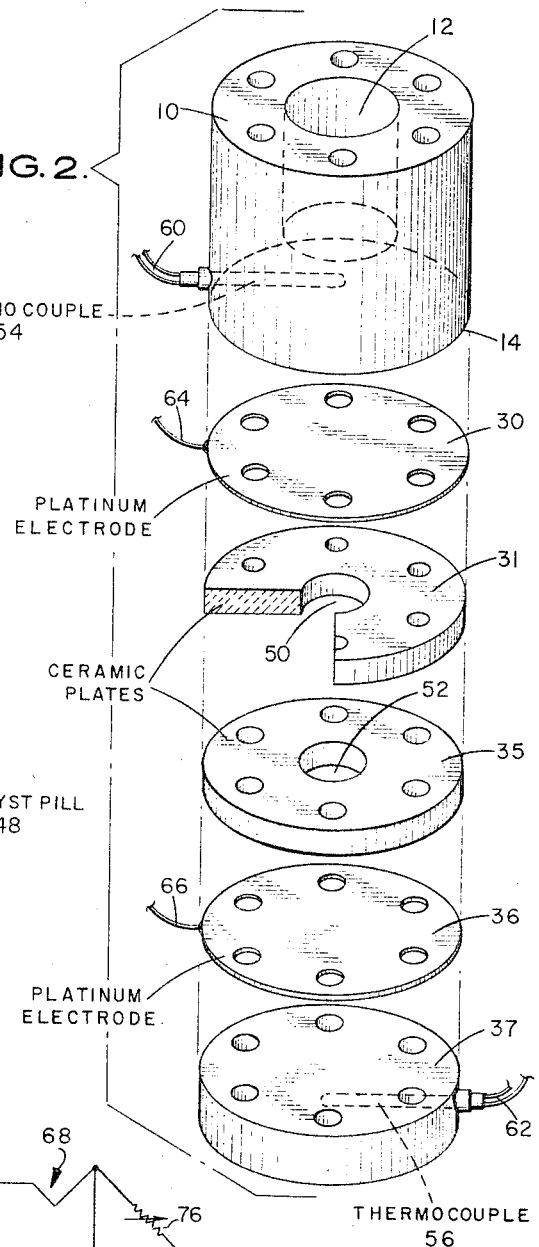
FIG. 2 is an exploded isometric view showing some of the component parts of FIG. 1.

Referring to the drawing and more particularly to FIGS. 1 and 2, the apparatus for indicating an electrical property of the catalyst includes a cylindrical support 10. The cylindrical support 10 is made of a nonconducting material such as a ceramic. A bore 12 is formed within the cylindrical ceramic support 10 with the bore 12 extending from the top of the support 10 to a point adjacent the bottom 14 of the support 10.

A tubular support 16 preferably made of stainless steel and having a lower portion 18 of increased diameter is used to support a heater 20. Heater 20 extends from the lower portion 18 of the tubular support 16. The lower portion of heater 20 is cemented firmly within the bore 12 of cylindrical support 10.

A pair of electrical coils 22 and 24 extending through an insulator 26 conducts electrical current to the heater 20.

An upper electrode plate 30 is mounted on the bottom of cylindrical support 10 and is clamped thereagainst by a circular plate member 31 provided with a central bore 50 therethrough. (See FIG. 2.) Members 10, 30, and 31 are pressed together by means of bolts 32 and nuts 34.

A lower plate electrode 36 is positioned between circular plates 35 and 37 and is held pressed therebetween by means of bolts 38 and nuts 39. The circular plate 35 is also provided with a central bore 52 therethrough. Members 10, 31, 35, and 37 are made of an insulating material such as ceramic. The plate electrodes 30 and 36 are preferably made of platinum. The bores 50 and 52 of circular ceramic plates 31 and 35, respectively, are each provided to receive an end of a catalyst pill 48. When the parts are assembled as shown in FIG. 1, the ends of the catalyst pill 48 are pressed against the plate electrodes 30 and 36 by means of bolts 40 and nuts 41. Bolts 32 extend through members 10, 30, and 31. Bolts 38 extend through members 35, 36, and 37, while bolts 40 extend through the entire assembly of plates and electrodes.

A thermocouple 54 is positioned within the upper cylindrical support 10 and extends from a side of support 10 to a point below the bore 12 and above the catalyst pill 48. A second thermocouple 56 is positioned within the lower support member 37. Thermocouple 56 extends from a side of support 37 to a point below catalyst pill 48. The thermocouples 54 and 56 are insulated from the electrodes 30 and 36, respectively.

Insulated wires 60 lead to thermocouple 54. Insulated wires 62 lead to thermocouple 56. Insulated wires 64 and 66 are connected to the platinum plates 30 and 36, respectively.

Figure 3:
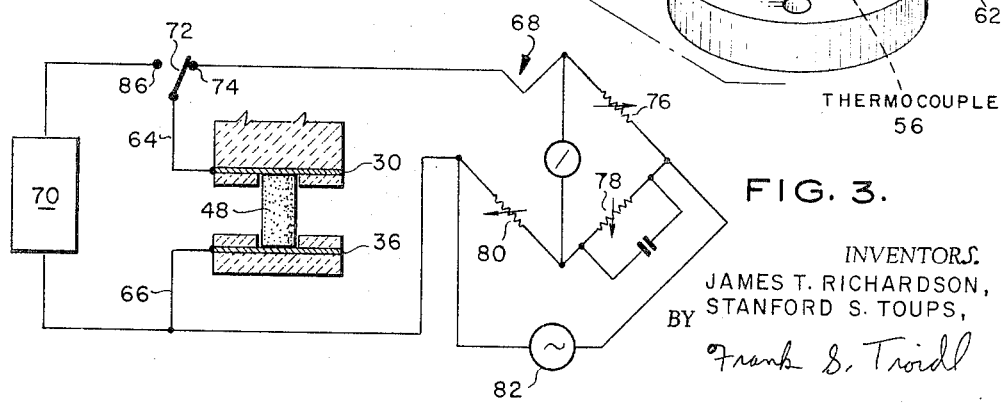
FIG. 3 is an electrical schematic view of a preferred electrical circuit for measuring the electrical conductivity and thermal E.M.F. of the catalyst pill contained within the apparatus.

FIG. 3 is an electrical schematic diagram showing circuits for measuring two electrical parameters of the catalyst pill 48. As shown in FIG. 3, the electrical wires 64 and 66 may be connected either to a bridge circuit 68 or a thermal E.M.F. indicator 70. When the switch 72 is in contact with switch contact 74, the electrical parameter measured is the A.C. resistance of the catalyst. The bridge circuit 68 including the variable resistors 76, 78, and 80 is supplied an A.C. current of say 1,000 cycles per second by means of oscillator 82. The catalyst pill 48 forms the fourth arm of the Wheatstone bridge 68. The A.C. conductivity, $\sigma$, of the catalyst pill 48 is given by $\sigma = L/RA$, where:

L is the length of the pill,
A the cross-sectional area of the pill, and
R the measured resistance.

When it is desired to measure the thermal E.M.F. of the catalyst pill 48, the switch 72 is switched to contact 86. The thermal E.M.F. is defined as, $Q = \Delta E / \Delta T$, where:

$\Delta E$ = E.M.F. generated across the length of the pill and
$\Delta T$ = thermal gradient across the pill.

In operation, the catalyst pill is pressed between the two platinum electrodes. One end of the pill is heated by the heater 20 in such a way that a thermal gradient preferably in the range of from 5° C. to 20° C. is established across the pill 48. The apparatus is then inserted in a catalyst bed consisting of the same material as the pill and is thus subject to the same conditions of temperature, pressure, etc., as the catalyst in the catalyst bed. The electrical properties measured are thus representative of those of the catalyst material.

The A.C. conductivity and/or the thermal E.M.F. of the catalyst are measured by means of the circuit shown in FIG. 3. These parameters are characteristic of the electrical properties of the catalyst which, in turn, are related to the catalytic properties according to the electronic theory of catalysis in a manner which may be determined empirically. The $\Delta T$ is indicated by the thermocouples. The signals obtained from the apparatus may be used to measure the catalytic state of the catalyst or to actuate control devices to change the state.

Examples of suitable catalysts are the oxides of nickel, zinc, and copper supported on suitable inert supports.

We claim:

1. An apparatus for indicating an electrical property of a catalyst comprising: a cylindrical support made of nonconducting material and having a coaxial bore extending from the top thereof to a point above the bottom thereof; a thermocouple mounted in said cylindrical support and extending from a side of said cylindrical support to a point below the bottom of said bore in said cylindrical support; an upper plate electrode mounted on the bottom of the cylindrical support; a lower support member; a lower plate electrode mounted on the lower support member; a thermocouple mounted in said lower support member and extending from a side of said lower support member to approximately the center of the lower support member; means permitting movement of the lower plate electrode toward and away from the upper plate electrode whereby a catalyst pill can be pressed between the electrodes and removed, respectively; a heater within the bore in the cylindrical support for establishing a temperature gradient through the catalyst, which temperature gradient is indicated by said thermocouples; and an electrical circuit including said plate electrodes.

2. An apparatus in accordance with claim 1 wherein said electrical circuit indicates the A.C. conductivity of the catalyst.

3. An apparatus in accordance with claim 2 wherein said electrical circuit indicates the thermal E.M.F. of the catalyst.

References Cited by the Examiner
UNITED STATES PATENTS

| | | | |
|---|---|---|---|
| 2,799,051 | 7/1957 | Coler et al. | 324—62 |
| 2,852,850 | 9/1958 | Martin | 324—32 |
| 2,970,411 | 2/1961 | Trolander | 324—62 |
| 2,994,818 | 8/1961 | Harman | 324—32 |
| 3,016,732 | 1/1962 | Hanysz et al. | 324—32 |

WALTER L. CARLSON, *Primary Examiner.*

W. H. BUCKLER, *Assistant Examiner.*